United States Patent [19]

Suzuki et al.

[11] Patent Number: 5,036,349
[45] Date of Patent: Jul. 30, 1991

[54] AUTOFOCUSING SYSTEM FOR CAMERA

[75] Inventors: Noboru Suzuki; Shigeo Toji, both of Tokyo; Masahiro Kawasaki, Saitama, all of Japan

[73] Assignee: Asahi Kogaku Kogyo Kabushiki Kaisha, Tokyo, Japan

[21] Appl. No.: 407,424

[22] Filed: Sep. 14, 1989

[30] Foreign Application Priority Data

Sep. 14, 1988 [JP] Japan .................... 63-230925
Sep. 14, 1988 [JP] Japan .................... 63-230926

[51] Int. Cl.⁵ .................. G03B 13/36; G03B 5/00
[52] U.S. Cl. .................. 354/402; 354/195.12
[58] Field of Search .......... 354/400, 402-409, 354/195.1, 195.12; 250/201.2, 201.8; 358/227

[56] References Cited

U.S. PATENT DOCUMENTS

| Re. 31,219 | 4/1983 | Shenk | 354/400 |
|---|---|---|---|
| 4,329,033 | 5/1982 | Masunaga et al. | 354/402 |
| 4,387,975 | 6/1983 | Araki | 354/407 |
| 4,435,058 | 3/1984 | Yoshida et al. | 354/403 |
| 4,470,683 | 9/1984 | Nakajima | 354/406 |
| 4,509,842 | 4/1985 | Taniguchi et al. | 354/402 |
| 4,560,267 | 12/1985 | Nakai et al. | 354/286 |
| 4,623,238 | 11/1986 | Taniguchi et al. | 354/402 X |
| 4,920,370 | 4/1990 | Taniguchi et al. | 354/402 |

FOREIGN PATENT DOCUMENTS

| 53-113527 | 10/1978 | Japan . |
|---|---|---|
| 58-103273 | 6/1983 | Japan . |
| 62-133430 | 6/1987 | Japan . |
| 62-133431 | 6/1987 | Japan . |
| 62-200340 | 9/1987 | Japan . |
| 63-5331 | 1/1988 | Japan . |
| 63-189817 | 8/1988 | Japan . |
| 63-220118 | 9/1988 | Japan . |
| 64-44428 | 2/1989 | Japan . |
| 64-44429 | 2/1989 | Japan . |
| 64-56406 | 3/1989 | Japan . |
| 64-62608 | 3/1989 | Japan . |
| 64-79713 | 3/1989 | Japan . |
| 1-99011 | 4/1989 | Japan . |
| 1-99012 | 4/1989 | Japan . |
| 1-123206 | 5/1989 | Japan . |
| 1-131509 | 5/1989 | Japan . |

Primary Examiner—W. B. Perkey
Attorney, Agent, or Firm—Sandler, Greenblum & Bernstein

[57] ABSTRACT

An autofocusing system for a camera, wherein a defocus amount is detected with a light-amount-integration type detector for performing a focusing operation. The focusing operation is adjusted in a predetermined fashion if it is determined that a photographic lens has moved and/or the focal length of the photographic lens has varied while the light-mount-integration is being executed.

24 Claims, 10 Drawing Sheets

AUTOFOCUSING SYSTEM FOR CAMERA

BACKGROUND OF THE INVENTION

The present invention relates to an autofocusing system for a camera which is adapted for use in forming an image of an object on a light receiving element of an amount-of-light integration type by means of a luminous flux incident through a lens and obtaining a defocus amount of the with respect to a object by integrating the amount of light.

So-called TTL (Through-The-Lens) type focus detection systems (wherein the detection of the defocus amount depends on the state of the image formed with luminous flux transmitted through a photographic lens) is widely employed, as an automatic focusing system in cameras, such as single-lens reflex cameras, which require a true in-focus condition.

In this case, a delivery-amount-of-lens conversion factor, Kval, is used to convert the defocus amount into AF (Auto-Focus) motor drive pulse numbers.

Kval in this specification is defined as a delivery amount of lens per unit movement of an image surface. The term Kval may also be defined as a movement of the image surface per unit delivery-amount of lens; in the case of the latter, however, the size relation therebetween is reversed in the following description.

Since the Kval assumes different values based on the focal length of the lens in the case of a zoom lens, it is stored as variable data in a ROM (Read Only Memory) that is provided in the lens unit. It is noted that a lens system having a variable focal length can be either a zoom lens system or a variable-focal lens system. Accordingly, although the following explanation will be given only with respect to the zoom lens system, it should be noted that the present invention is also similarly applicable to the variable-focal lens systems.

Figure 11:
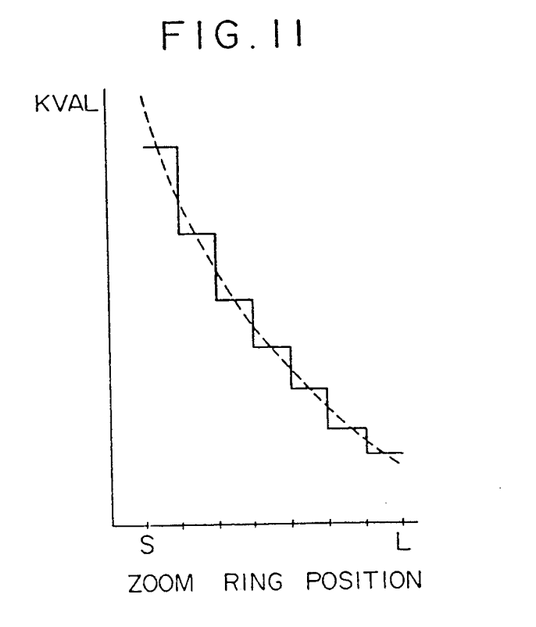
FIGS. 11 and 12 show graphs illustrating the relation between the focal length and Kval and the relation between the focal length and what is detected from the zoom code plate, etc. in a conventional autofocusing system.

According to the aforementioned definition, the longer the focal length, the smaller the Kval value becomes, and vice versa, as represented by a curve shown by a broken line in FIG. 11. As the focal length of a lens is not directly detectable, the zoom ring position is shown, in FIG. 11, as a variable corresponding to the focal length.

Figure 12:
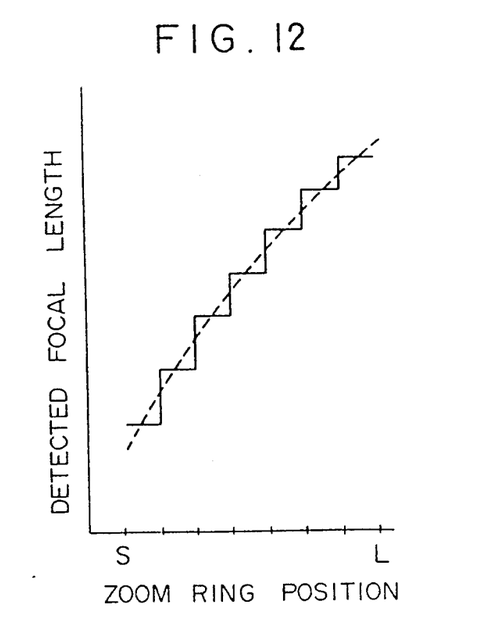

Conventionally, Kval is obtained from a zoom code detected through brushes that are in slidable contact with a code plate supported by the zoom ring and a stationary ring of a lens barrel, whereby it is obtained as intermittent data providing one value between the zoom codes, as shown by a continuous line in FIG. 12. This is also applicable to a case where the focal length is detected as shown in FIG. 12. In order to distinguish between the actual focal length and what is detected from the zoom code plate, the latter is shown in FIG. 12 as a detected focal length.

If, however, the data stored in the lens ROM is addressed according to the zoom code detected from the zoom code plate, Kval tends to become roughly controlled. Therefore, accurate AF control may not be performed.

Furthermore, when the focusing lens stands still, the lens is only necessary to start driving it by obtaining the drive amount from the detected defocus amount and the aforementioned Kval.

Figure 13:
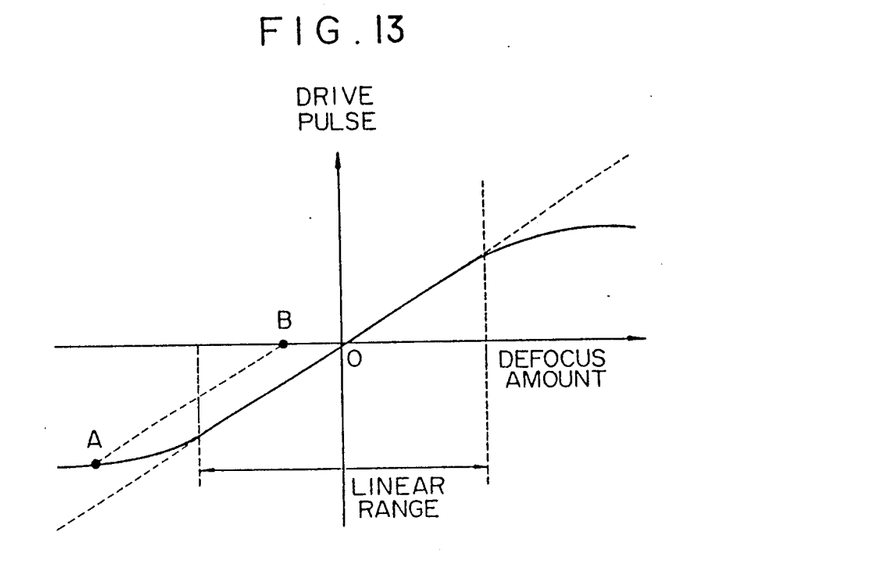
FIG. 13 shows a graph illustrating the relation between Kval and the defocus amount.

In case the defocus amount is large, as shown in FIG. 13, the linearity of the Kval will not be ensured. Since Kval is determined over a linear range, the lens will stop at point B and may not be in focus, as shown by a dotted line in FIG. 13, if the defocus amount is detected at a point A to excute the AF control.

The defocus amount has to accordingly be detected in such a zone that Kval linearly varies to obtain an accurate drive amount. In other words, it becomes necessary to carry out CCD-integration and, when the defocus amount is large, to carry out the CCD-integration during the AF driving operation.

Figure 14:
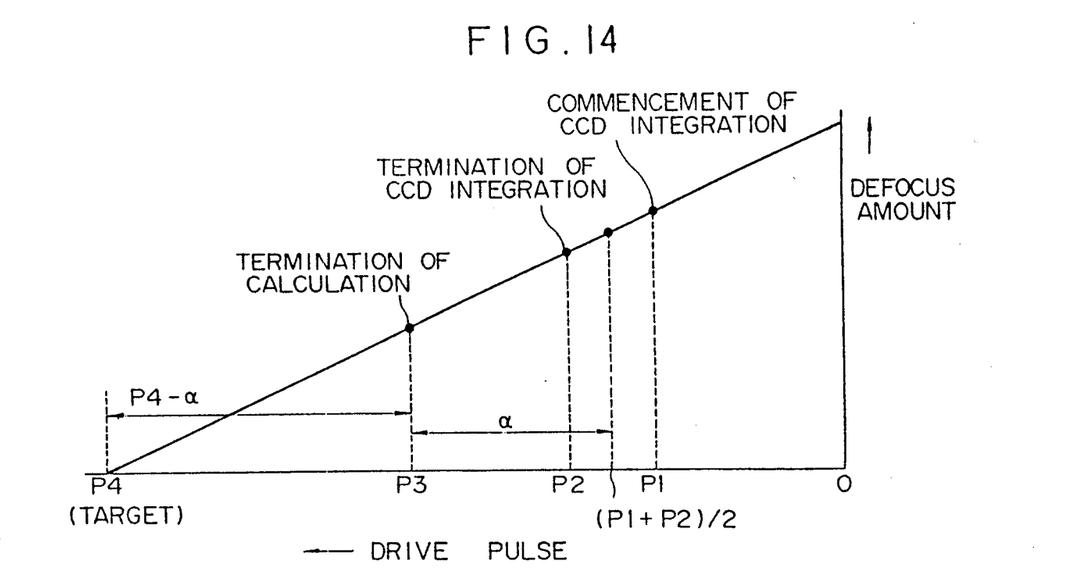
FIG. 14 shows a graph explanatory of the principle of overlapping integration.

The amount to drive a lens is proportional to the AF-motor-drive pulse numbers and, provided the lens operates with a uniform motion, the drive-pulse numbers are also proportional to time. In FIG. 14, the number of pulses from a stop point up to the commencement of the CCD-integration is designated as P1; the number of pulses up to the termination of the integration is designated as P2; the number of pluses up to the termination of the conversion into the drive-pulse numbers from the defocus amount detected from the CCD output is designated as P3; and the number of pulses up to a target in-focus position is designated as P4.

With a simple calculation, the number of pulses obtained through the aforementioned calculation corresponds to the midpoint between the timing at which the integration is started (P1) and the timing at which it is terminated (P2), i.e. to the defocus amount when the lens is located at the position corresponding to the number of pulses (P1+P2)/2. However, the lens is actually located slightly closer by a number of pulses $\alpha$ to the target than the midpoint. As a result, an overlapping part equivalent to the number of pulses $\alpha$ may be included in the drive amount according to a simple calculation.

The number of drive pluses is therefore determined by subtracting the overlapping part $\alpha$ from the number of pulses up to the target, the number of which is obtained from the simple calculation when the drive pulse is computed during the AF driving operation. The calculation of the drive pulse during the AF driving operation is defined as "overlapping integration" in this specification.

If, however, zooming is conducted during the overlapping integration (in the case of a zooming lens), an accurate AF control cannot be effected because Kval changes by the zooming of the lens.

SUMMARY OF THE INVENTION

It is therefore an object of the present invention to provide an autofocusing system for a camera that is capable of more accurately calculating Kval accompanying a zooming operation by detecting the drive amount of a zoom motor for conducting the zooming operation.

Another object of the invention is to provide an autofocusing system for a camera that is capable of exercising accurate AF control even though the zooming is conducted during overlapping integration.

For the above purposes, in accordance with the invention, there is provided an autofocusing system for a camera, wherein a defocus amount is detected with a light-amount-integration type detecting means, depending upon a focusing operation being executed, the system comprising means for driving a photographic lens, means for detecting a focal length of the photographic lens, factor output means for outputting a delivery-amount-of-lens conversion factor for converting the defocus amount into an amount to drive of the photographic lens in compliance with the output of the focal length detection means, factor calculation means for computing the conversion factor from the output of the factor output means at the time when the light-amount-integration starts and at the time when the integration terminates means for determining whether the photographic lens is moved while the light-amount-integration is being executed, means for calculating an amount to drive the photographic lens from the output of the factor output means at the time when the integration terminates and the defocus amount if the determining means determines that the photographic lens has not moved, while the drive amount calculating means determines the drive amount from the conversion factor that is computed by the factor calculation means and the defocus amount if the determining means determines that the photographic lens has moved.

According to another aspect of the invention, there is provided an autofocusing system for a camera, wherein a defocus amount is detected with a light-amount-integration type detecting means, depending upon which a focusing operation is executed, the system comprising means for driving a photographic lens; means for monitoring changes of a focal length of the photographic lens, and means for computing an amount to drive the photographic lens, the drive amount corresponding to the defocus amount detected by the detecting means, with a driving-amount-of-lens conversion factor for converting the defocus amount of the photographic lens; wherein the computing means compensates the conversion factor in accordance with the direction of change of the focal length monitored by said monitoring means if the focal length varies while an integration operation is being executed.

In a further aspect of the invention, there is provided an autofocusing system for a camera, comprising: a zoom motor for zooming a photographic lens, a focusing motor for focusing the photographic lens, means for driving the focusing motor, means for monitoring the drive amount of the zoom motor, means for detecting a defocus amount of the photographic lens, factor output means for outputting a delivery-amount-of-lens conversion factor for converting the defocus amount into the drive amount of the focusing motor in compliance with the output of the monitoring, and means for computing the drive amount, to be transmitted to the driving means, from the conversion factor and the defocus amount.

A further aspect of the invention provides an autofocusing system for a camera, comprising: a zoom motor for zooming a photographic lens, focusing motor for focusing the photographic lens, driving the focusing motor, means for monitoring the drive amount of the zoom motor, means for detecting the focal length of the photographic lens by indicating one of a plurality of divided sections of the focal length, depending upon the output of the monitoring means, means for detecting a defocus amount of the photographic lens means for outputting a reference factor value of a delivery-amount-of-lens conversion factor for converting the defocus amount into a drive amount for the focusing motor in compliance with the output of the focal length detecting means, correction factor output means for outputting a change-rate of the conversion factor in a section indicated by the focal length detecting means, first for computing the conversion factor, as a primary function within the same section with the reference factor, the output of the monitoring means and the change-rate, and means for calculating the drive amount, to be transmitted to the driving means from the conversion factor and said defocus amount.

According to other aspects of the invention, there is provided an autofocusing system for a camera, wherein a defocus amount is detected with a light-amount-integration type detecting means when a focusing operation is executed, the system comprising means for determining whether a photographic lens has moved while the light-amount-integration is being executed by the detecting means, wherein the focusing operation is adjusted in a predetermined fashion if it is determined by the determining means that the photographic lens has moved while the light-amount-integration is being executed.

In still another aspect of the invention, there is provided an autofocusing system for a camera, wherein a defocus amount is detected with a light-amount-integration type detecting means, while a focusing operation is executed, comprising means for determining whether a focal length of a photographic lens has varied while the light-amount-integration is being executed by the detecting means, wherein the focusing operation is adjusted in a predetermined fashion if it is determined by the determining means that the focal length of the photographic lens has varied while the light-amount-integration is being executed.

DESCRIPTION OF THE EMBODIMENTS

Figure 1:
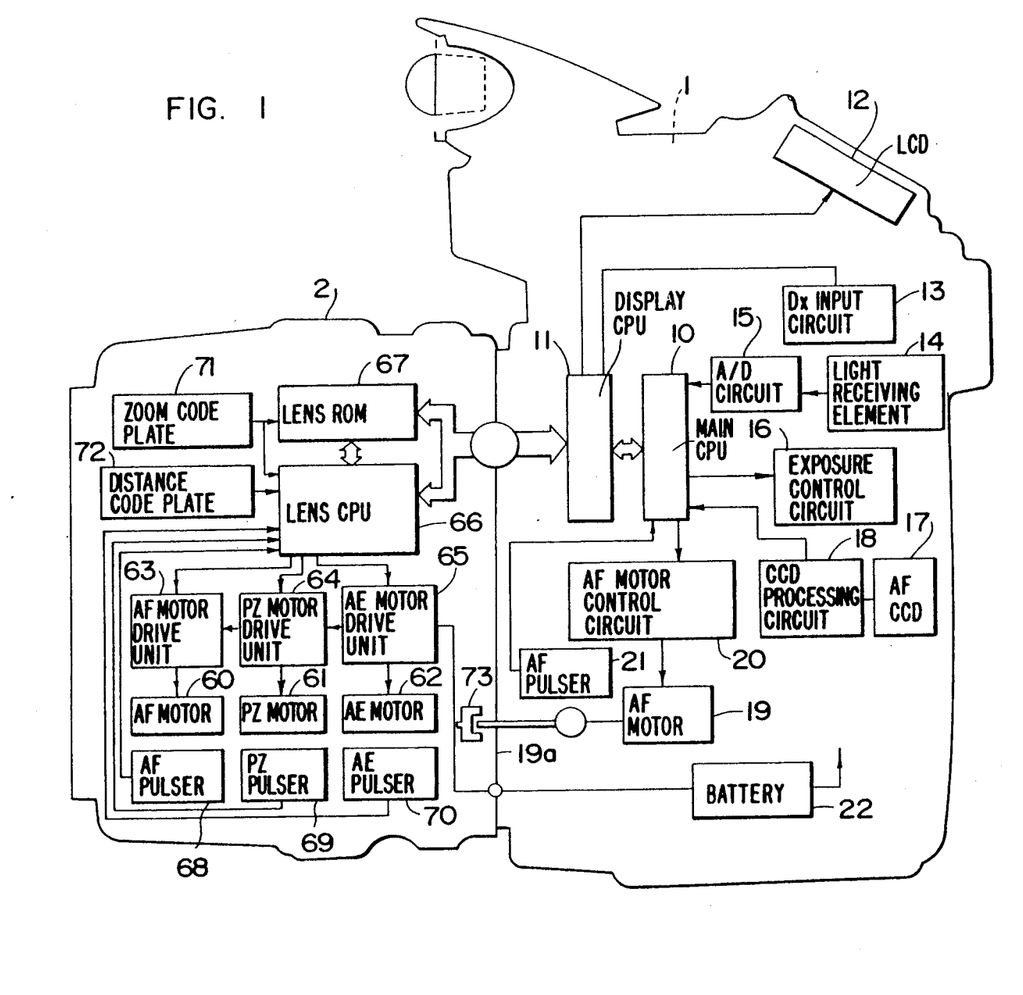
FIG. 1 shows a block diagram illustrating a camera having a system embodying the present invention.

FIG. 1 is a schematic block diagram illustrating a camera system equipped with an autofocusing system embodying the present invention.

Camera body 1 is equipped with two CPUs: a main CPU 10 for processing various kinds of photographic data; and a display CPU 11 for receiving data mainly via switches, transmitting and receiving data to and from a photographic lens, and displaying the data. With these CPUs as the main components, the camera body 1 further comprises an LCD panel 12 for displaying various kinds of data, a DX code input circuit 13 for receiving ISO (International Standard Organization) sensitivity of a film for use based on the DX code printed on a film cartridge, a light receiving element 14 for measuring the a luminance of an object by luminous flux incident via the photographic lens, an A/D converter circuit 13 for subjecting the output of the light receiving element to an A/D conversion, an exposure control circuit 16 for controlling a shutter on the basis of various photographic conditions, an AF CCD 17 for receiving light from an image of the object formed by the luminous flux incident via the photographic lens, and a CCD processing circuit 18 for detecting the defocus amount of the photographic lens from the output of the AF CCD 17.

An automatic focusing (AF) motor 19, for focusing the lens, is used for transmitting the driving force toward the photographic lens via a coupler 19a when the photographic lens of a conventional type without having the AF motor is mounted and provided together with an AF motor control circuit 20 for driving the AF motor 19 by computing the output of the CCD processing circuit 18 and an AF pulser 21 for detecting the drive amount of the AF motor 10.

A battery 22 is designed to supply power to various motors, which will be described later, within the photographic lens and a CPU in addition to each active element in the camera body 1.

The photographic lens 2 incorporates three motors: an AF motor 60, a power zoom (PZ) motor 61 and an automatic exposure (AE) control motor 62, for performing a focusing, zooming and exposure control operation.

The photographic lens 2 has a cam mechanism similar to that of a conventional type lens for effecting focusing and zooming by means of cam rings for use in moving each of the lens groups relative to the optical axis, the aforementioned AF motor 60 and the PZ motor 61 being used for driving the cam rings so that it rotates.

The motors are controlled by a lens CPU 66 via an AF motor drive unit 63, a PZ motor drive unit 64 and an AE motor drive unit 65, respectively.

A data input means for the lens CPU 66 comprises a lens ROM 67 for storing data inherent to the lens. An AF pulser 68, a PZ pulser 69 and an AE pulser 70 detect the drive amounts of the respective motors in the form of pulses; a zoom code plate 71 and a distance code plate 72 for detecting the respective revolved positions of the zooming and focusing cam rings.

The code plate actually consists of a code plate secured to the cam ring and a plurality of brushes that are in slidable contact with the code plate that is fitted to the fixed ring and which is arranged so that an absolute revolved position of each cam ring is detected from a state in which the brushes come into contact therewith. However, the term "code plate" is herein used as a general term, to refer to the brushes and plates as a whole for purposes of convenience.

The lens CPU 66 is coupled to the controlled system and the input means and is also capable of communicating with the camera body 1 via groups of electric contact which are provided at a mount port. e.g. it functions as a means for computing the drive amount while referring to the data stored in the lens ROM 67 upon receipt of the defocus amount detected on the camera body side, for driving the AF motor while detecting the drive amount using the AF pulser 60 and for driving the AE motor 62 to rotate while detecting the drive amount using the AE pulser 70 on the basis of an exposure value determined on the camera body side.

Moreover, the lens is provided with an AF coupler 73 for driving the focusing lens so that focusing can be performed by the AF motor on the body side in line with the situation involved.

The lens CPU 66 controls each of the motor drive circuits in the lens according to the data from the lens ROM or what is transferred from the body and transfers set data to the body side.

The lens ROM 67 stores data inherent in the photographic lens; e.g. data concerning an F-number at a open aperture, an F-number at a minimum open aperture, the amount of change of Kval accompanied by zooming, etc., and sending out data under the control of the CPU on the body side.

In the zooming lens of this example, upper addresses of the lens ROM 67 are specified in conformity with the zoom codes detected from the zoom code plate, whereas lower addresses are internally prepared by counting the clocks applied.

Kval is a value which varies in accordance with the focal length of the lens; the longer the focal length, the smaller it normally becomes, and vice versa. Kval is computed by dividing the same zoom code zone detected from the zoom code plate into a small plurality of small steps using the PZ pulse delivered from the PZ pulser in this system. Accurate AF control is thus implemented.

Figure 2:
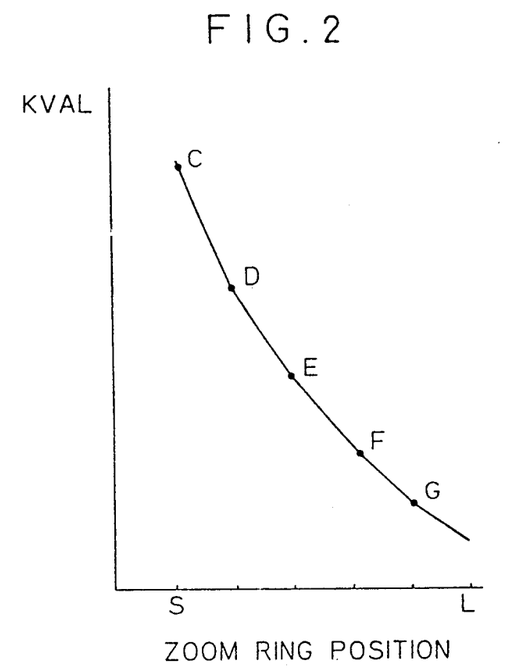
FIGS. 2 and S show graphs illustrating the relation between the focal length and Kval of a lens and the relation between the focal length and what is detected from the zoom code plate, etc. in the system embodying the present invention, respectively.

More specifically, Kval changes smoothly by nature as shown by a broken line in FIG. 2. In the case of this lens, a set of forefront Kval (Kh), Kval correction factor (Kc) and the forefront number of pulses Ph corresponding to one zoom code zone is read out of the lens ROM, these values and the absolute number of pulses Ps from a Wide extremity of the present zoom lens by means of the PZ pulser are employed as a primary function of Equation (1) below to control a change of Kval in one zoom code zone.

$$Kval = Kh + Kc*(Ps - Ph) \tag{1}$$

The forefront Kval (Kh) and the forefront number of pulses Ph respectively equal Kval and the number of pulses at the Wide extremity in one focal length zone detected from the zoom code plate and represent points C–G in FIG. 2. On the other hand, Kval correction factor (Kc) equals an incline of a line connecting the respective forefront Kvals. Although the Kval within the same section of the zoom code plate is controlled as the primary function in this embodiment, it may be stored in such a manner that it corresponds to the absolute number pulses Ps.

Figure 3:
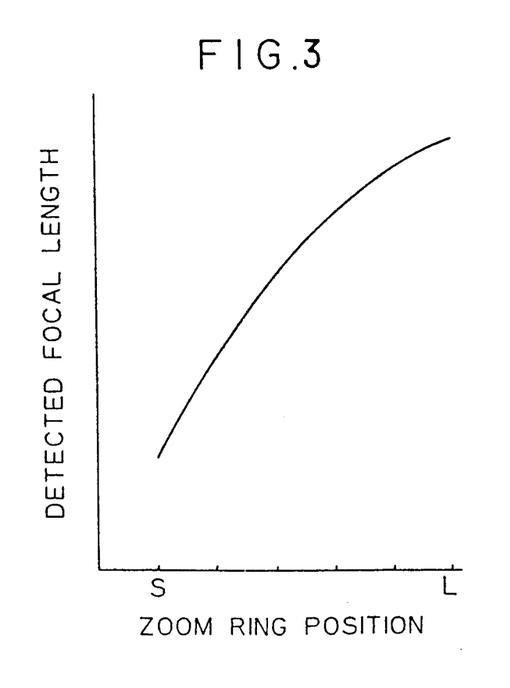

In this system, the detected focal length f is controlled as shown by Equation (2) (see FIG. 3).

$$f = fh + fc*(Ps - Ph) \tag{2}$$

where fh = forefront focal length and fc = focal length correction factor.

An image-magnification-fixing control thus becomes possible. The image-magnification-fixing control means that the focal length of the lens is caused to change in such a manner as to keep the size of an image of an object constant even though the distance between the object and the camera varies in such a camera that power zooming is fulfilled by the zoom motor.

This control is exercised by computing changes of focal length corresponding to variations of focal length corresponding to variations of magnification from the defocus amount after the object which has once been focused moves, and further, converting the change into zoom motor drive pulses in such a camera as a single-lens reflex camera in which the focus detection system is employed for automatic focusing.

In this camera system, further Kvals at the time of commencement and termination of the CCD integration are inputted so that an accurate AF operation can be realized even when the focal length of the photographic lens change during the AF operation and the calculation of the drive pulse is based on both values.

The operation of this system will subsequently be described.

FIGS. 4 through 7 are graphs illustrating the relationship between the focal length and defocus amount of the lens, and the number of drive pulses of the focusing lens by way of example.

Figure 4:
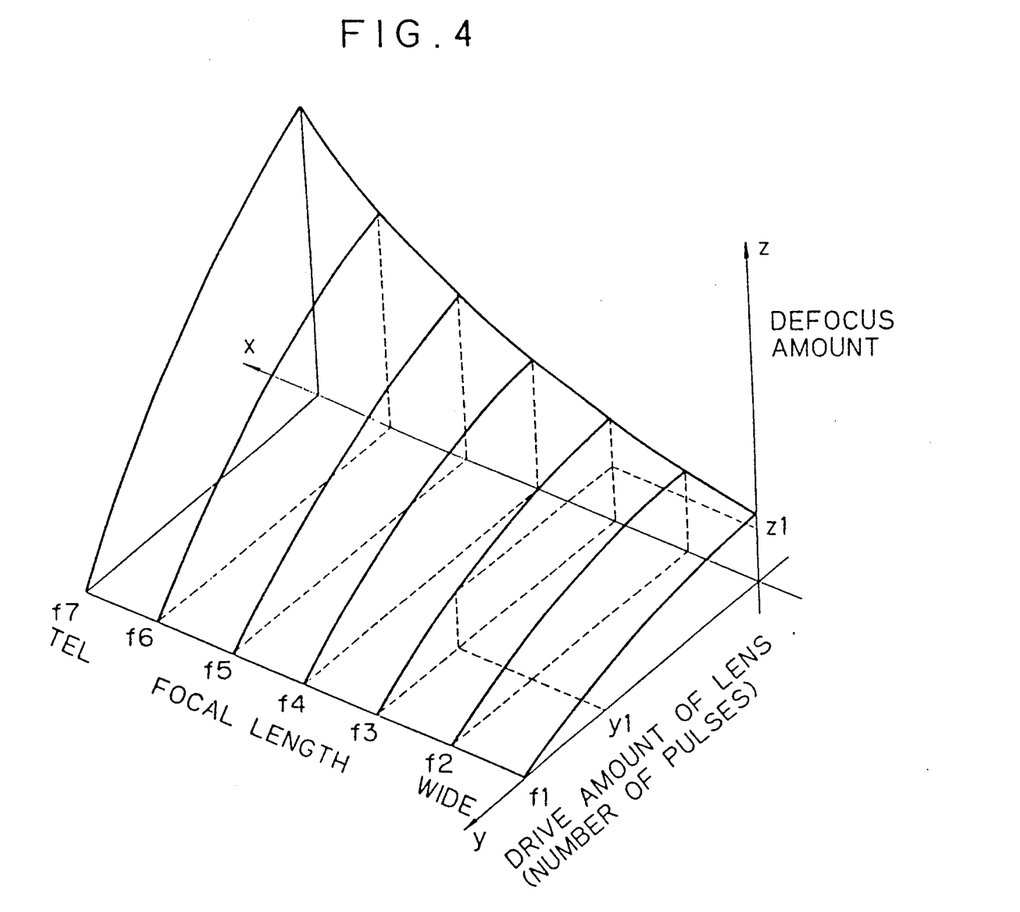
FIGS. 4 through 7 show graphs each illustrating the relations among the focal length the defocus amount and the drive amount of focusing lens.

In FIG. 4, axes x, y, z represent the focal length of the lens, the number of AF drive pulses and the defocus amount thereof, respectively. Assume the focal length between the Wide and Tele extremities consists of f1–f7. For instance, the number of drive pulses up to the in-focus state with the focal length f3 relative to the defocus amount z1 is designated as y1.

Figure 5:
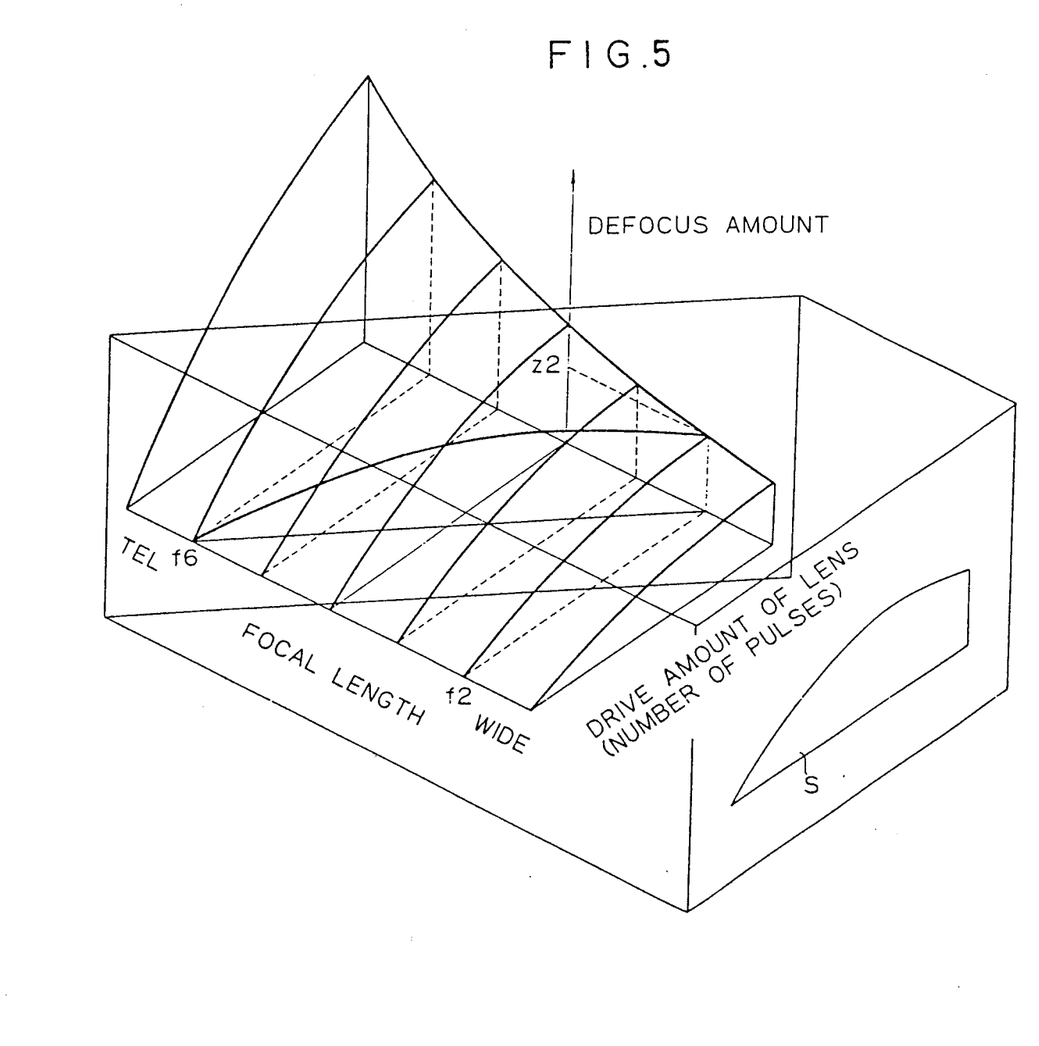

FIG. 5 refers to the operation of focusing the lens, staying at the position corresponding to the defocus amount z2 while zooming is conducted at the focal f2–f6. A curve on a plane S resulting from projecting a section in parallel to the axis z on the y-z plane shows a decrease in the defocus amount accompanied by the driving of the lens.

Figure 6:
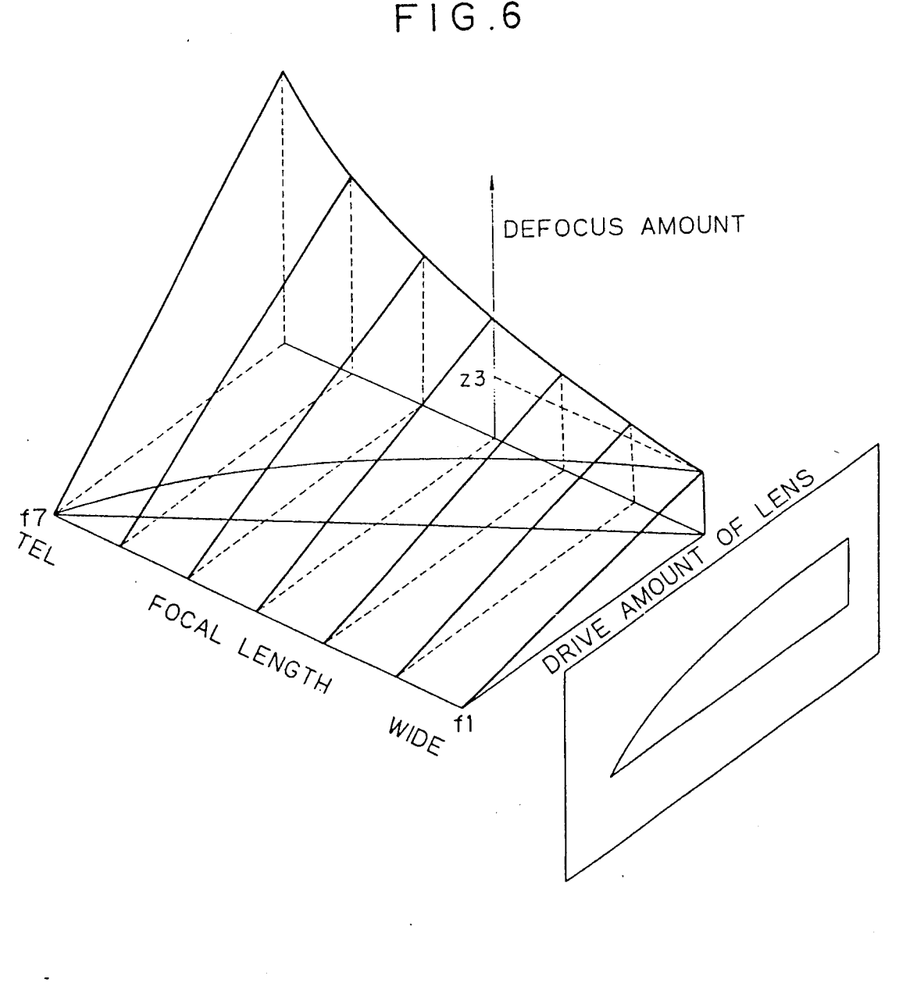
Figure 7:
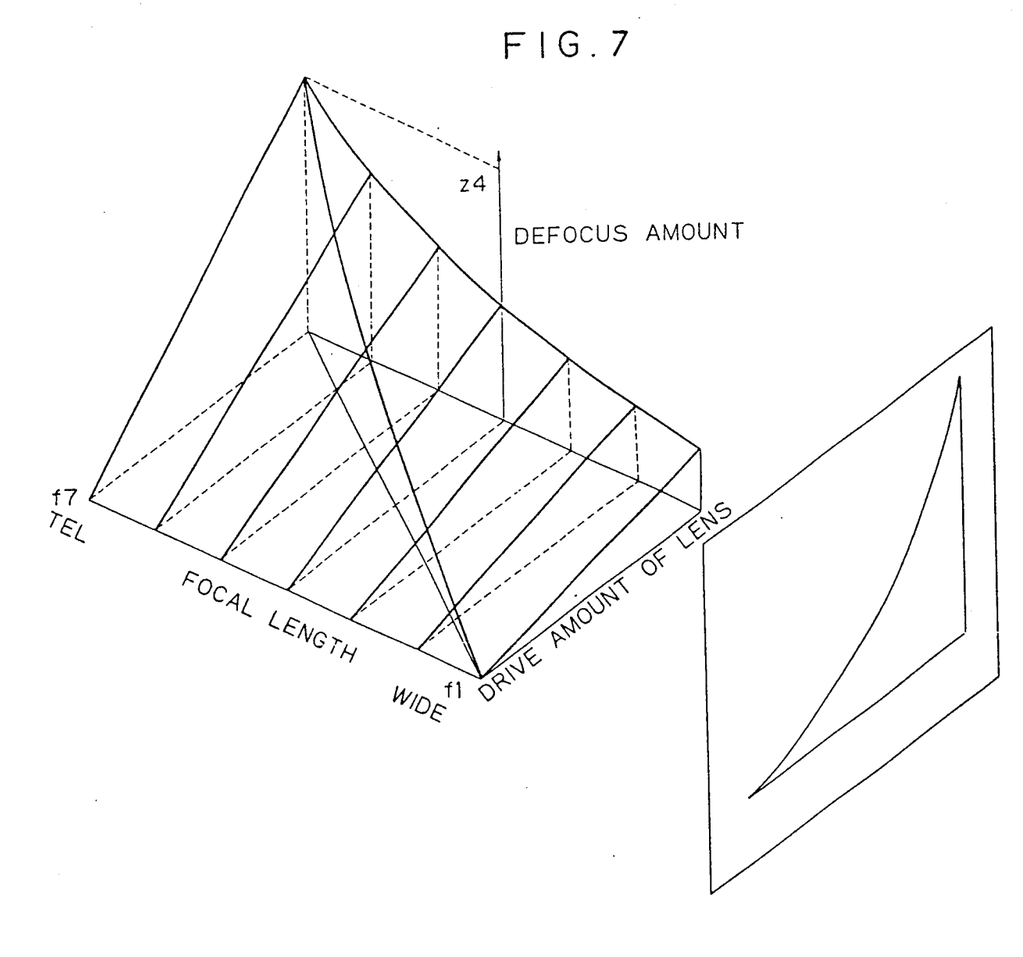

FIG. 6 refers to operations wherein the lens, staying at a position corresponding to the defocus amount z3, is focused while zooming is conducted between Wide extremity f1 and Tele extremity f7. FIG. 7 refers, on the contrary, to operations wherein the lens, staying at a position corresponding to the defocus amount z4 is focused while zooming is conducted between Tele extremity f7 and Wide extremity f1. These three cases indicate that the number of pulses is the same, even though each of the defocus amounts differs from the others.

As is easily understood from the projection drawings of FIG. 5 through 7, the process of decreasing the defocus amount when zooming is conducted from the Wide side to the to Tele side differs from the process of decreasing the same when the zooming is conducted from the Tele side to the Wide side side. When overlapping integration is carried out while the lens is driven to be in focus, accurate AF control is exercised by taking the aforementioned processes into consideration.

Figure 8:
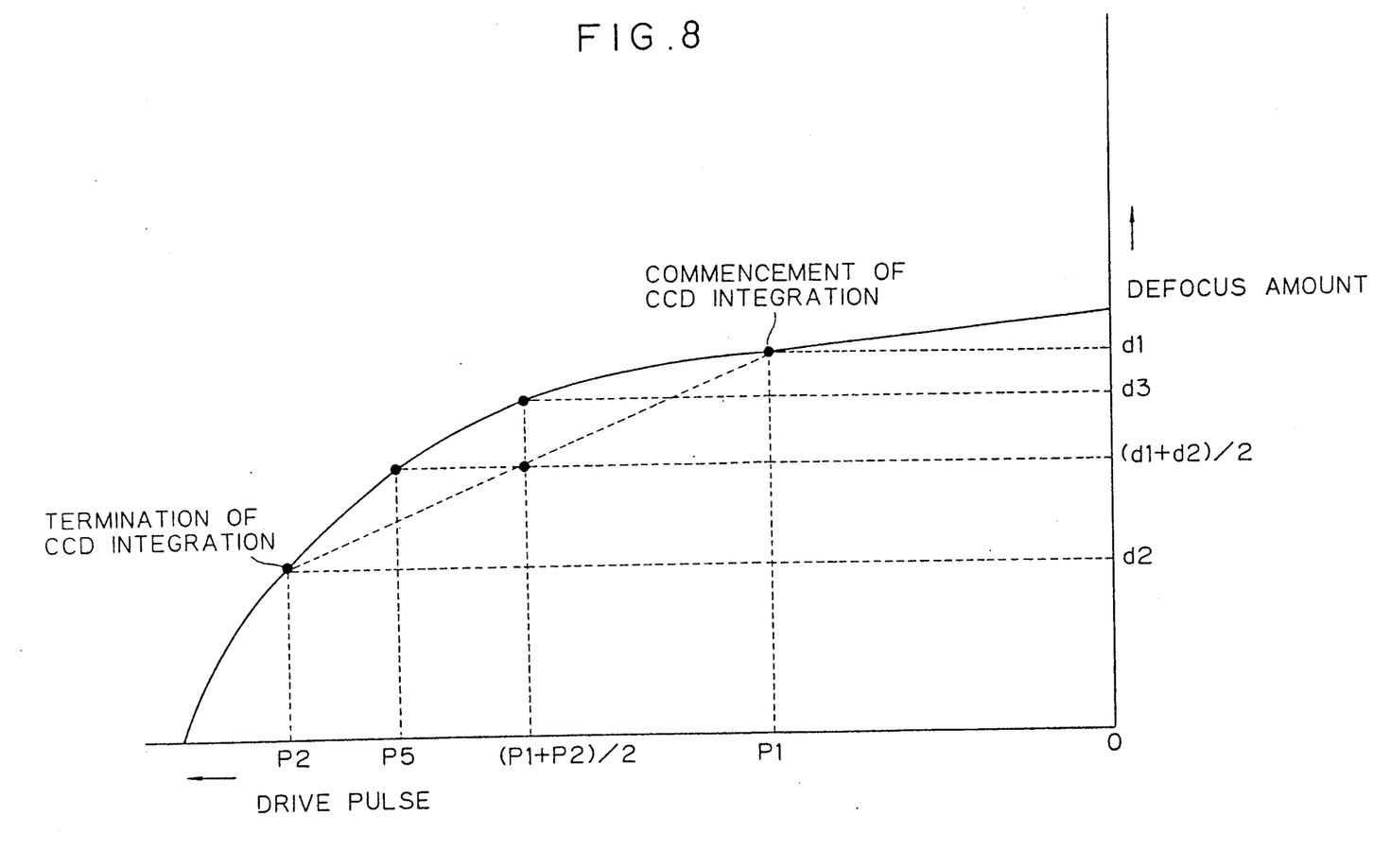
FIG. 8 shows a graph explanatory of the principle of overlapping integration during the zooming operation.

Referring to FIG. 8, the overlapping integration will be described in detail.

FIG. 8 is a graph illustrating partially enlarged processes shown in FIGS. 5 and 6 for carrying out the overlapping integration while zooming is conducted from the Wide to the Tele side.

The defocus amount obtained from the overlapping integration conforms as described above to the mean value of factors when the integration is started and terminated, i.e., becomes $(d1+d2)/2$. The Kval generally used for obtaining the number of pulses equivalent to the defocus amount can be obtained using the mean value of Kval (K1) and Kval (K2) when the integration is started and terminated.

The number of drive pulses obtained using the mean value of Kvals becomes $(P1+P2)/2$, which is different from the number of pulses P5 corresponding to the actual defocus amount. The Kval for use in the pulse calculation in this system is, therefore, reduced by n% when the overlapping integration is carried out while zooming is conducted from the Wide to the Tele side, whereby a value approximating the number of pulses with P5 as the starting point can be calculated.

When the overlapping integration is carried out, while zooming is conducted from the Tele side to the Wide side, the Kval for use in the pulse calculation is increased by n% so that the defocus pulse curve bends downward. Incidentally, the calculation of n% is based on the Kvals corresponding to those at the times when the integration is started and terminated, respectively.

Figures 9, 10:
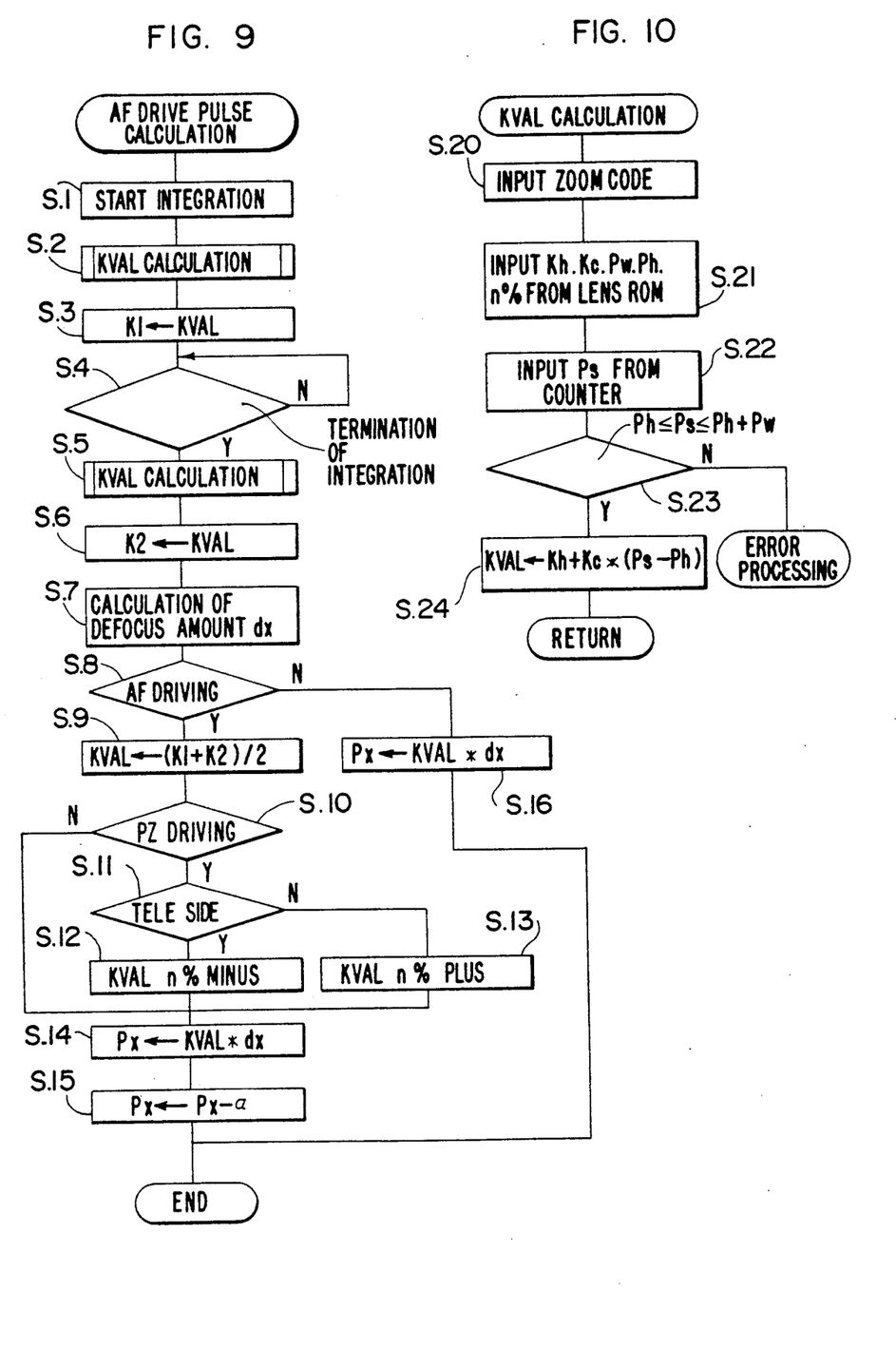
FIGS. 9 and 10 show flowcharts illustrating the operation of an in-focus detection device embodying the present invention.

Referring to FIGS. 9 and 10, the operation of the system thus constructed will be described.

FIG. 9 is a flowchart for use in computing the AF drive pulse. The CCD integration is started in Step 1 (hereinafter, all steps are abbreviated in the FIGS., such as "S.1" for step 1) and Kval at the focal length at the time of starting the integration is computed by a Kval calculation subroutine in Step 2.

The calculation of Kval is carried out in accordance with the flowchart shown in FIG. 10. In Step 20, the present zoom code is obtained from the zoom code plate. In Step 21, the forefront Kval (Kh), etc. corresponding to the zoom code are supplied from the lens ROM.

In Step 22, the present number Ps of zoom lens drive pulses counted from the Wide extremity is fed from the counter for counting the pulses produced by the PZ pulser. In Step 23, a decision is made as to whether the Ps fed in Step 22 exists in between the forefront Ph in the corresponding zoom code zone and the sum of the number of pulses Pw corresponding to that code zone and Ph. Since the Ps is present within this range so long as the pulser operates properly, the pulser or counter is assumed to be malfunctioning if the Ps is not within the range and all calculations followed by error processing are suspended.

Provided that Ps is within the predetermined range, the Kval is obtained, in Step 24, in conformity with the aforementioned Equation (1), and processing returns to the AF Drive Pulse Calculation routine, shown in FIG. 9.

When Kval is computed in Step 2 of FIG. 9; it is made equal to Kval (K1) at the time the integration is started. In Step 4, the completion of the CCD integration is awaited so that Kval (K2), at the time of termination of the integration is obtained in Step 5 and 6 and the defocus amount is computed in Step 7.

Step 8 is followed by Step 9 during the AF driving operation, i.e. when the overlapping integration is carried out to set the mean value of K1 and K2 as Kval. In Step 10, a decision is made as to whether the PZ motor is being driven. While zooming is conducted from the Wide side to the Tele side, n% is subtracted from the Kval obtained in Step 9, whereas n% is added when the zooming is conducted from the Tele side to the Wide side.

Subsequently, drive pulse Px is computed, in Step 14, from the aforementioned Kval and the defocus amount dx. In Step 15, the ultimate drive pulse is computed by subtracting the above overlapping segment $\alpha$.

When the AF driving operation is not performed, Step 8 branches to Step 16 to obtain the drive pulse Px based on the Kval, K2 after the termination of the integration.

The lens CPU 66 controls the output of the AF pulser according to the drive pulse Px obtained through the aforementioned calculation. Furthermore, the AF motor drive unit 63 controls the AF motor 60. Zooming is thus conducted and the lens is focused with respect to an object.

Although a description has only been given of a camera which employs a silver halide film, the present invention is not limited thereto but is also applicable to so-called electronic still cameras using, e.g. a photoelectric conversion element, such as a two-dimensional CCD or the like as a pickup means on condition that the lens is interchangeable.

As set forth above, the autofocusing system for a camera according to the present invention allows accurate AF control to be exercised even when zooming is conducted during the overlapping integration on determining the delivery-amount-of-lens conversion factor by detecting such factors when the integration is started and terminated and further basing the determination on both factor values.

Furthermore, the present invention allows accurate AF control to be exercised by accurately controlling the delivery-amount-of-lens conversion factor using the drive amount of the zoom motor.

What is claimed is:

1. An autofocusing system for a camera, wherein a defocus amount is detected with a light-amount-integration type detecting means, in response to which a focusing operation is executed, comprising:
    means for driving a photographic lens associated with said camera;
    means for detecting a focal length of said photographic lens;
    means for outputting a delivery-amount-of-lens conversion factor for converting said defocus amount into a drive amount to drive said photographic lens in compliance with the output of said focal length detecting means;
    means for calculating said conversion factor from the outputs of said delivery-amount-of-lens conversion factor outputting means from the time when said integration terminates;
    means for determining whether said photographic lens has moved while said light-amount-integration is being executed; and
    means for calculating said drive amount of said photographic lens from the output of said factor output means, at the time when said integration terminates, and said defocus amount if said determining means determines that said photographic lens has not moved, while calculating said drive amount of said photographic lens from said conversion factor computed by said factor calculation means and said defocus amount if said determining means determines that said photographic lens has moved.

2. The autofocusing system according to claim 1, wherein said factor calculation means is arranged so as to compute a mean value of said conversion factor outputted from the time when said integration starts to the time when said integration terminates.

3. The autofocusing system according to claim 2, wherein said conversion factor calculating means compensates said conversion factor in accordance with a direction of change of said focal length of said photographic lens if said focal length varies while said integration is being executed.

4. An autofocusing system for a camera, wherein a defocus amount is detected with a light-amount-integration type detecting means, upon which a focusing operation is executed, comprising:
    means for driving a photographic lens associated with said camera;
    means for monitoring focal length changes of said photographic lens; and
    means for computing an amount to drive said photographic lens, corresponding to said defocus amount detected by said light-amount-integration type detecting means with a driving-amount-of-lens conversion factor for converting said defocus amount of said photographic lens;
    wherein said computing means compensates said conversion factor in accordance with a direction of change of said focal length monitored by said monitoring means if said focal length varies while said integration is being executed.

5. An autofocusing system for a camera, comprising:
    a zoom motor for zooming a photographic lens associated with said camera;
    a focusing motor for focusing said photographic lens;
    means for driving said focusing motor;
    means for monitoring a drive amount that said zoom motor is driven;
    means for detecting a defocus amount of said photographic lens;
    means for outputting a delivery-amount-of-lens conversion factor for converting said defocus amount into said drive amount for driving said focusing motor in compliance with the output of said monitoring means; and
    means for computing said drive amount to be transmitted to said driving means from said conversion factor and said defocus amount.

6. An autofocusing system for a camera, comprising:
    a zoom motor for zooming a photographic lens associated with said camera;
    a focusing motor for focusing said photographic lens;
    means for driving said focusing motor;
    means for monitoring a drive amount that said zoom motor is driven;
    means for detecting a focal length of said photographic lens by indicating one of a plurality of divided sections of said focal length, depending upon the output of said monitoring means;
    means for detecting a defocus amount of said photographic lens;
    means for outputting a reference value of a delivery-amount-of-lens conversion factor for converting said defocus amount into said drive amount of said focusing motor in compliance with the output of said focal length detecting means;
    correction factor output means for outputting a change-rate of said conversion factor in said section indicated by said focal length detecting means;
    means for computing said conversion factor as a primary function within said same section with said reference factor, the output of said monitoring means and said change-rate; and
    means for calculating said drive amount to be transmitted to said driving means from said conversion factor and said defocus amount.

7. An autofocusing system for a camera, wherein a defocus amount is detected with a light-amount-integration type detecting means while a focusing operation is being executed, comprising:
    first means for determining whether a photographic lens associated with said camera has moved while said light-amount-integration is being executed by said detecting means; and second means for determining whether a focal length of said photographic lens has changed while said light-amount-integration is being executed by said detecting means, wherein said focusing operation is adjusted in a predetermined fashion if it is determined by said first and second determining means that said photographic lens has moved and said focal length thereof has changed while said light-amount-integration is being executed.

8. An autofocusing system for a camera, wherein a defocus amount is detected with a light-amount-integration type detecting means while a focusing operation is executed, comprising:

means for determining whether a focal length of a photographic lens associated with said camera has varied while said light-amount-integration is being executed by said detecting means; and means for adjusting said focusing operation in a predetermined fashion if it is determined by said determining means that the focal length of said photographic lens has varied while said light-amount-integration is being executed.

9. An autofocus system for a camera, comprising:

means for setting a photographic lens associated with said camera to a particular focal length;

means for detecting said focal length of said photographic lens;

means for analyzing a quantity of light that passes through said photographic lens when a photographer is about to take a photograph of an object in order to obtain a value representing an amount of defocus of said object to be photographed;

means for calculating a conversion factor in response to inputted data, wherein said inputted data includes said defocus amount, said conversion factor calculating means being arranged so as to compute a mean value of said conversion factor from the time when a light-amount-integration starts to the time when said light-amount-integration stops, said conversion factor calculating means compensating said conversion factor in accordance with a direction of change of said focal length of said photographic lens if said focal length of said photographic lens varies as said light-amount-integration is being executed;

means for determining whether said photographic lens has moved while said conversion factor is being calculated; and means for calculating an amount to move said photographic lens, based upon said conversion factor calculating means and said defocus value, if said determining means determines that said photographic lens has been moved.

10. An autofocus system for a camera, comprising:

means for setting a photographic lens associated with said camera to a particular focal length;

means for detecting said focal length of said photographic lens;

means for analyzing a quantity of light that passes through said photographic lens when a photographer is about to take a photograph of an object in order to obtain a value representing an amount of defocus of said object to be photographed;

means for calculating a conversion factor in response to inputted data, wherein said inputted data includes said defocus amount, said calculating means reducing said conversion factor when said photographic lens is zoomed from a wide side of said photographic lens to a tele side of said photographic lens;

means for determining whether said photographic lens has moved while said conversion factor is being calculated; and means for calculating an amount to move said photographic lens, based upon said conversion factor calculating means and said defocus value, if said determining means determines that said photographic lens has been moved.

11. An autofocus system for a camera, comprising:

means for setting a photographic lens associated with said camera to a particular focal length;

means for detecting said focal length of said photographic lens;

means for analyzing a quantity of light that passes through said photographic lens when a photographer is about to take a photograph of an object in order to obtain a value representing an amount of defocus of said object to be photographed;

means for calculating a conversion factor in response to inputted data, wherein said inputted data includes said defocus amount, said calculating means increasing said conversion factor when said photographic lens is zoomed from a tele side of said photographic lens to a wide side of said photographic lens;

means for determining whether said photographic lens has moved while said conversion factor is being calculated; and means for calculating an amount to move said photographic lens, based upon said conversion factor calculating means and said defocus value, if said determining means determines that said photographic lens has been moved.

12. A method for performing an autofocus operation in a camera using a light-amount-integration type detector to determine a defocus value, comprising the steps of:

driving a photographic lens associated with the camera;

monitoring focal length changes of the photographic lens as it is driven;

computing an amount to drive the photographic lens in response to the defocus value determined by the light-amount-integration type detector, using a driving-amount-of-lens conversion factor; and compensating the conversion factor based upon the direction of change of the focal length of the photographic lens, if the focal length of the photographic length is varied while the light-amount-integration is being executed.

13. The method of claim 12, wherein the step of compensating the conversion factor reduces the conversion factor when zooming of the photographic lens is conducted from a wide side to a tele side of the photographic lens.

14. The method of claim 12, wherein the step of compensating the conversion factor comprises increasing the conversion factor when zooming of the photographic lens is conducted from a tele side of the photographic lens to a wide side of the photographic lens.

15. An autofocusing system for a camera comprising:

a light-amount-integration type detector for obtaining a defocus value of a light source that passes through a photographic lens associated with said camera;

means for detecting a focal length of said photographic lens;

means for driving a focusing motor associated with said photographic lens so as to vary the focal length of said photographic lens;

means for converting said defocus value into a drive amount for driving said defocusing motor; and means for calculating a compensation value for adjusting said drive amount used to drive said focusing motor when the focal length of said photographic lens is varied during the time that said light-amount-integration type detector obtains said defocus value.

16. The autofocus system of claim 15, wherein said calculating means increases said drive amount of driving said focusing motor when said photographic lens is moved from a tele side to a wide side.

17. The autofocus system of claim 15, wherein said calculating means decreases said drive amount for driving said focusing motor when said photographic lens is moved from a wide side to a tele side.

18. The autofocus system of claim 15, wherein said light-amount-integration type detector comprises a charge-coupled-device.

19. The autofocus system of claim 15, further comprising means for storing data inherent to said photographic lens, said data being used by said converting means.

20. The autofocus system of claim 19, wherein said storing means comprises a memory.

21. The autofocus system of claim 20, wherein said memory is located in said photographic lens.

22. The autofocus system of claim 15, wherein said converting means comprises a lens processor that computes said drive amount.

23. The autofocus system of claim 19, wherein said converting means comprises a lens processor that computes said drive amount while referring to said inherent data stored in said storing means upon receipt of said defocus value detector by said light-amount-integrator type detector.

24. The autofocus system of claim 23, wherein said storing means comprises a memory located in said photographic lens.

* * * * *